US011026765B2

(12) United States Patent
Nelson et al.

(10) Patent No.: US 11,026,765 B2
(45) Date of Patent: Jun. 8, 2021

(54) STABILIZED, WATER-JET SLURRY APPARATUS AND METHOD

(71) Applicant: H2O Tech, Inc., Spanish Fork, UT (US)

(72) Inventors: Timothy D. Nelson, Spanish Fork, UT (US); Daren N. Heaton, Spanish Fork, UT (US)

(73) Assignee: H2O Tech, Inc., Spanish Fork, UT (US)

( * ) Notice: Subject to any disclaimer, the term of this patent is extended or adjusted under 35 U.S.C. 154(b) by 0 days.

(21) Appl. No.: 13/938,385

(22) Filed: Jul. 10, 2013

(65) Prior Publication Data

US 2015/0017607 A1 Jan. 15, 2015

(51) Int. Cl.
*A61C 3/025* (2006.01)
*B24C 1/04* (2006.01)
*B24C 11/00* (2006.01)
*C09K 3/14* (2006.01)

(52) U.S. Cl.
CPC ............ *A61C 3/025* (2013.01); *B24C 1/045* (2013.01); *B24C 11/00* (2013.01); *C09K 3/1463* (2013.01)

(58) Field of Classification Search
CPC ..... A61C 3/025; A61C 3/02; A61C 1/00–188; A61C 5/40; A61C 17/00–40; B24C 11/00; B24C 11/005; B24C 1/045; C09K 3/1463
USPC .............................. 433/215; 451/40; 51/298
See application file for complete search history.

(56) References Cited

U.S. PATENT DOCUMENTS

| 5,527,204 A | * | 6/1996 | Rhoades | ................. | B24C 1/045 |
| | | | | | 451/39 |
| 6,024,566 A | | 2/2000 | Bruns et al. | | |
| 6,139,320 A | | 10/2000 | Hahn | | |
| 6,221,814 B1 | | 4/2001 | Kaburagi et al. | | |
| 6,517,416 B1 | | 2/2003 | Crevasse et al. | | |
| 6,544,307 B2 | | 4/2003 | Shimamoto et al. | | |
| 6,562,090 B1 | * | 5/2003 | Melbouci | ................. | A61K 8/19 |
| | | | | | 424/49 |

(Continued)

FOREIGN PATENT DOCUMENTS

| CN | 1133574 A | 10/1996 |
| CN | 1449277 A | 10/2003 |

(Continued)

OTHER PUBLICATIONS

Dunn, Katherine; "Neutralization" Chemistry LibreTexts. Accessed at "https://chem.libretexts.org/Textbook_Maps/Physical_and_Theoretical_Chemistry_Textbook_Maps/Supplemental_Modules_(Physical_and_Theoretical_Chemistry)/Acids_and_Bases/Acid%2F%2FBase_Reactions/Neutralization" on Sep. 26, 2018.*

(Continued)

*Primary Examiner* — Edward Moran
(74) *Attorney, Agent, or Firm* — Michael Best & Friedrich LLP

(57) ABSTRACT

A method for removing dental material is disclosed. The method may include suspending, by a hydrated polymeric material, a quantity of abrasive media. The hydrated polymeric material and suspended abrasive media may then be pressurized. Accordingly, an abrasive stream may be formed by expelling, under pressure, the hydrated polymeric material and suspended abrasive media from a nozzle. The abrasive stream may be precisely applied to a tooth to abrade the enamel or dentin thereof as a drilling instrumentality.

14 Claims, 5 Drawing Sheets

(56) References Cited

U.S. PATENT DOCUMENTS

| | | | |
|---|---|---|---|
| 6,612,911 B2 | 9/2003 | Carter et al. | |
| 6,645,624 B2 | 11/2003 | Adefris et al. | |
| 6,673,754 B1* | 1/2004 | Nabeshima et al. | 508/507 |
| 6,812,193 B2 | 11/2004 | Brigham et al. | |
| 6,866,507 B2 | 3/2005 | Beerstecher | |
| 7,326,054 B2* | 2/2008 | Todd et al. | 433/88 |
| 7,563,383 B2 | 7/2009 | de Rege Thesauro et al. | |
| 7,905,653 B2 | 3/2011 | Wilmer et al. | |
| 8,075,697 B2 | 12/2011 | Beck | |
| 2003/0092364 A1* | 5/2003 | Erickson | B24C 1/045 451/75 |
| 2004/0202980 A1 | 10/2004 | Policicchio | |
| 2009/0090696 A1 | 4/2009 | White et al. | |
| 2010/0081281 A1 | 4/2010 | Babu et al. | |
| 2015/0007400 A1* | 1/2015 | Gonzales | C11D 3/14 15/104.93 |

FOREIGN PATENT DOCUMENTS

| | | |
|---|---|---|
| CN | 102027101 A | 4/2011 |
| JP | 2003022066 | 1/2003 |
| JP | 2004-506472 | 3/2004 |
| JP | 10-2011-0013417 | 2/2011 |
| KR | 2003022066 | 3/2003 |
| WO | 9526267 A1 | 5/1995 |
| WO | 95-26167 A1 | 10/1995 |
| WO | 0217869 A2 | 3/2002 |
| WO | WO2009/058274 A1 | 5/2009 |
| WO | WO2009/131556 A1 | 10/2009 |

OTHER PUBLICATIONS

Swift et al. "The pH-responsive behavior of poly(acrylic acid) in aqueous solution is dependent on molar mass", Soft Matter, 2016, 12, 2542-2549 (Year: 2016).*

"PH of Acrylic Acid". Accessed at https://www.whatistheph.com/substance/Acrylic_acid (Year: 2020).*

"TRIS Base". Accessed at http://www.interchim.fr/ft/0/031657.pdf (Year: 2020).*

* cited by examiner

STABILIZED, WATER-JET SLURRY APPARATUS AND METHOD

BACKGROUND

1. Field of the Invention

This invention relates to cutting solid materials and, more particularly, to novel systems and methods for manufacturing and using a slurry abrasive.

2. Background Art

Stone cutting relies on diamond-coated saws, polycrystalline diamond compacts, girt blasting, and the like. Suspension slurries have not been effective for several reasons. A principal problem is setting out. Thus, industrial, dental, mining, drilling, and other examples, of cutting are not typically able to stop and go with a slurry. Instead, they must mix abrasive at the point of use.

Herein, dental drilling will be used as an example. It is one of the most demanding applications. Precision and timing are particularly rigorous. Likewise, control is critical, and must accommodate instantaneous stops and starts. Nevertheless, the problems to be solved span the range of industrial uses of cutting slurries.

Currently, the most widely used method for removing tooth material (e.g., drilling out decayed tooth material) involves a high speed, rotary drill. However, the use of such a device has significant disadvantages. For example, use of a rotary drill may damage the enamel of a tooth, which may weaken the structure of the tooth. Due to size limitations, use of a rotary drill often requires the removal of considerable more healthy material than would otherwise be necessary. Moreover, patients often experience discomfort from the grinding and vibrations that accompany use of a rotary drill.

To overcome the disadvantages associated with a rotary drill, certain alternative methods of removing tooth material have been introduced. One such method utilizes air abrasion. Air abrasion systems use pressurized air to propel abrasive particles against the tooth. While such systems can be effective for shallow cavities, they take too long to drill below the outer enamel layer of the tooth and into softer tissues.

Another alternative to the rotary drill involves laser drilling and cutting technology. However, the adoption of laser systems has been slowed by their high cost.

Still another alternative to the rotary drill is using pressurized water to drill teeth. A system that uses pure water or particle-entrained streams to remove oral material is disclosed in U.S. Pat. No. 7,326,054. However, such systems can be hampered or limited in certain ways, primarily due to the rapidity with which particles precipitate out of the water, causing clogs and other problems.

In view of the foregoing, there is a need for improved systems and methods for drilling teeth and the like.

BRIEF SUMMARY OF THE INVENTION

In view of the foregoing, in accordance with the invention as embodied and broadly described herein, a method and apparatus are disclosed in one embodiment of the present invention as including a slurry, a delivery system for delivering or applying the slurry to a subject surface, or a combination of slurry and delivery system. In selected embodiments, a delivery system in accordance with the present invention may include a reservoir, a pressurizing device, an applicator, and a controller. A reservoir may contain a quantity of slurry. A pressurizing device may urge or convey, under pressure, slurry from a reservoir to an applicator. A controller may include a user interface through which a user may control (e.g., stop, start) the flow of slurry through a delivery system.

In selected embodiments, an applicator may receive high pressure slurry from a pressurizing device. After pressurized slurry reaches an applicator, it may be expelled through a nozzle of the applicator. Accordingly, a high pressure, but relatively slow, volumetric flow within an applicator may be converted as it exits a nozzle into a fine, high velocity flow or stream of slurry. The stream may be applied to a subject surface (e.g., a surface of a tooth) to remove material therefrom.

A slurry in accordance with the present invention may include a liquid, abrasive media, and mechanical suspension material. The liquid may enable the slurry to flow through a delivery system. The abrasive material may enhance or speed the excavation or drilling that can be performed by a delivery system. The mechanical suspension material may form a three-dimensional net that mechanically blocks individual particles of abrasive media from migrating within the liquid. Accordingly, a mechanical suspension material may stabilize the slurry and create an effective shelf life therefor.

In selected embodiments, a mechanical suspension material may comprise a hygroscopic polymer. Accordingly, when combined, a liquid (e.g., water) and a mechanical suspension material may form a hydrated polymeric material. Once abrasive media has been sufficiently mixed into such a hydrated polymeric material, it may be maintained thereat, mechanically suspended by polymeric chains.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
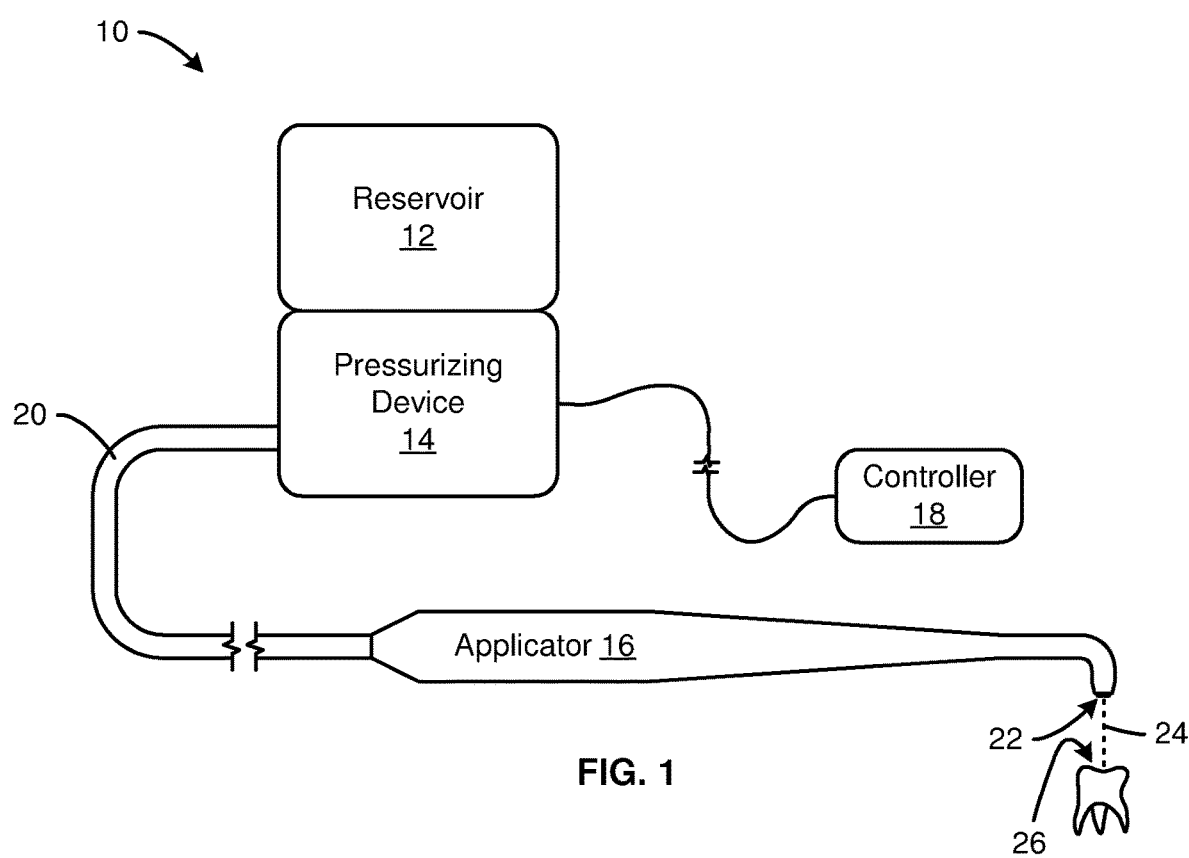
FIG. 1 is a schematic illustration of a delivery system for generating and directing a fine, high velocity flow or stream of slurry in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a slurry in accordance with the present invention may be delivered or applied to a subject surface by a delivery system 10. A delivery system 10 may have any suitable configuration. In selected embodiments, a delivery system 10 may include a reservoir 12, a pressurizing device 14, an applicator 16, a controller 18, or a combination or sub-combination thereof.

A reservoir 12 may comprise a container suitable to contain a quantity of slurry material. A pressurizing device 14 may urge or convey, under pressure, slurry from a reservoir 12 to an applicator 16. A controller 18 may provide a user with some control over the operation of a delivery system 10. For example, a controller 18 may include a user interface (e.g., a foot pedal, button located on an applicator 16, or the like) connected in some manner to a pressurizing device 14. Accordingly, by entering commands at the user interface, a user may control (e.g., stop, start) the flow of slurry through a delivery system 10.

In selected embodiments, an applicator 16 may receive high pressure slurry from the pressurizing device 14. A pressurizing device 14 may comprise a high pressure liquid pump or other pressure creation device (e.g., a pressurized tank of gas, a weighted piston, or a compressed flexible bladder). A pressurizing device 14 and an applicator 16 may be connected by any conduit 20 capable of repeatedly withstanding the pressures associated with a system 10 in accordance with the present invention.

After pressurized slurry reaches an applicator 16, it may be expelled through a nozzle 22 of the applicator 16. In selected embodiments, a nozzle 22 may have one or more orifices with widths or diameters that are (collectively or individually) significantly smaller than the interior dimensions of the applicator 16 and the conduit 20 feeding the applicator 16. Accordingly, a high pressure, but relatively slow, volumetric flow within the conduit 20, applicator 16, or both may be converted as it exits a nozzle 22 into one or more fine, high velocity flows 24 or streams 24 of slurry. The one or more streams 24 may be oriented or directed as desired by orienting or directing an applicator 16. Accordingly, a stream 24 may be precisely applied to a subject surface 26 (e.g., a surface 26 of a tooth or the like).

As a high velocity stream 24 of slurry impacts a subject surface 26, it energy is transferred, at least in part, to the subject surface 26. This exchange of energy may be sufficient to break away pieces (e.g., very small pieces, momentum matched to abrasive particles) of the subject surface 26. In this manner, a stream 24 of slurry may erode a subject surface 26. Accordingly, in selected embodiments, a delivery system 10 may be utilized as a precision excavator or "drill" in environments, applications, or situations where such precision may be valued (e.g., in dental drilling or the like).

Certain mathematical equations may be used to relate selected operating parameters of a delivery system 10 in accordance with the present invention. Accordingly, if a desired exit velocity of a stream 24 is known, then mathematical equations may be used to estimate an internal pressure required to obtain that exit velocity. For example, in selected embodiments, to obtain an exit velocity of from about 100 inches per second to about 1000 inches per second, slurry within a delivery system 10 may be pressurized to approximately 200 psi to 18,000 psi, respectively. Thus, for a particular delivery system 10, exit velocity may be correlated to internal pressure.

A delivery system 10 may operate in the range of from about 250 psi to about 17,000 psi. Which pressure or pressure range is optimal in a given application or situation may vary, depending on the composition of the slurry to be used, the size of the orifice in the nozzle 22, or the like, or combinations thereof. The higher the pressure, the faster a stream 22 may excavate or drill. Thus, for optimal control of a drilling procedure, a lower pressure may be preferred. Moreover, a lower pressure may be safer and require less expensive equipment within a delivery system 10. Accordingly, in selected embodiments, a delivery system 10 may most often operate in a range of from about 500 psi to about 2,500 psi.

In certain embodiments, a delivery system 10 in accordance with the present invention may operate at both higher and lower pressures during a single use (e.g., a single dental procedure). For example, a delivery system 10 may be configured to oscillate the pressure applied to the slurry. This may, in turn, oscillate the value of velocity of the slurry as it exits the nozzle 22.

In selected embodiments, a delivery system 10 in accordance with the present invention may include one or more of the components, arrangements, functions, or the like of the system disclosed in U.S. Pat. No. 7,326,054, which is hereby incorporated by reference. For example, a delivery system 10 may comprise the various the components, arrangements, functions, or the like of the system disclosed in U.S. Pat. No. 7,326,054, minus the mixers, abrasive feeders, or both thereof. The benefits provided by a slurry in accordance with the present invention may render such mixers and abrasive feeders unnecessary.

Figure 2:
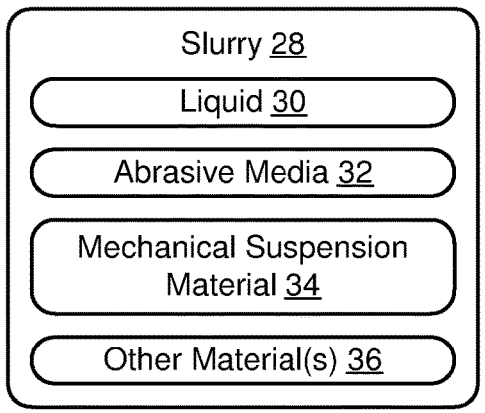
FIG. 2 is a schematic block diagram showing selected ingredients of a slurry in accordance with the present invention.

Referring to FIG. 2, a slurry 28 in accordance with the present invention may be stable. That is, a slurry 28 may retain all functionality for an extended period of time (e.g., an hour, day, month, or the like). Accordingly, in selected embodiments, a slurry 28 may be described of have a significant "shelf life" (e.g., a shelf life in the range of about 1 to about six months or even longer) during which it remains fully functional with abrasives 32 fully suspended in a liquid 30.

In certain embodiments, a slurry 28 may comprise a liquid 30, abrasive media 32, mechanical suspension material 34, or more other materials (e.g., pain reducers, cleaning materials, or the like), or any combination or sub-combination as desired or necessary. A liquid 30 may enable the slurry 28 to flow through a delivery system 10. In selected embodiments, a liquid 30 may be aqueous. Alternatively, suitable non-aqueous liquids may be used as desired or necessary.

An abrasive medium 32 may be selected to be compatible with a corresponding delivery system 10 and application. For example, when intended for use in an oral environment, abrasive media 32 may be required to comply with applicable health standards. Accordingly, abrasive media 32 comprising aluminum oxide or alumina, which has already been approved by the United State Food and Drug Administration, may be well suited for dental applications. Other abrasive media 32 may include pumice, baking soda, ilminite or the like. Other considerations that may be considered when selecting abrasive media 32 may include particle size, volumetric concentration, hardness, and insolubility in the liquid 30.

In selected embodiments, particle size may be a factor in determining or controlling the amount of material removed by a stream 24 in accordance with the present invention. Accordingly, particle size may vary between different embodiments or applications. In embodiments directed to the removal of decaying tooth matter, a particle size in the range of from about 1 micron to about 30 microns may be acceptable, while a range of from about 20 microns to about 30 microns may be preferred and about 25 microns may be ideal.

Particle size may be classified based on the size of screen or filter through which abrasive media 32 pass. Accordingly, references to particle size should be not be construed to limit abrasive media 32 to any one particle size. That is, a quantity of aluminum oxide with a particle size of 25 microns may include a certain percentage of particles that are larger or smaller than 25 microns, as typically occurs in a screening process.

In selected embodiments, a mechanical suspension material 34 may form a three-dimensional net that mechanically blocks individual particles of abrasive media 36 from migrating within a liquid 30. That is, due to the insolubility of abrasive media 32 within a liquid 30 and the difference in density between particles of the abrasive media 32 and the liquid 30, the abrasive media 32 may, if not blocked, easily and rapidly settle out of the liquid 30. Once such settling has occurred to any significant degree, the utility of the slurry 28 may be degraded or destroyed. Accordingly, by mechanically blocking individual particles of abrasive media 36 from migrating within a liquid 30, a mechanical suspension material 34 may stabilize the slurry 28 and create an effective shelf life therefor.

In selected embodiments, the shelf life of a slurry 28 in accordance with the present invention may be a period of time over which the abrasive medium 32 is maintained substantially evenly distributed within the liquid 30, mechanical suspension material 34, or some combination of both the liquid 30 and the mechanical suspension material 34. The exact value of that period of time may vary based on various factors including the temperature at which the slurry 28 is stored, presence or absence of accelerations or vibrations applied to the slurry 28, or the like. However, in selected embodiments, the shelf life of a slurry 28 in accordance with the present invention may be about six months or longer.

A mechanical suspension material 34 may have any suitable composition or make-up. In selected embodiments, a mechanical suspension material 34 may comprise a hygroscopic polymer. Accordingly, when combined, a liquid 30 (e.g., water) and a mechanical suspension material 34 may form a hydrated polymeric material. Once an abrasive medium 32 has been sufficiently mixed into a hydrated polymeric material, it may be maintained thereat, mechanically suspended by polymeric chains.

A mechanical suspension material 34 may comprise any suitable polymeric material or combination of polymeric materials. In selected embodiments, a mechanical suspension material 34 may comprise poly(acrylic acid), also known as PAA or Carbomer. For example, a CARBOPOL™ polymer brand marketed by LUBRIZOL™ may be a suitable mechanical suspension material 34. In selected embodiments, CARBOPOL 971™ has been found to be effective.

In selected embodiments, a slurry 28 in accordance with the present invention may include from about 70 percent to about 95 percent (and preferably from about 85 percent to about 95 percent) by-weight liquid 30 (e.g., water), from about five percent to about 30 percent (and preferably from about 7 percent to about 13 percent) by weight abrasive media 32 (e.g., alumina, aluminum oxide), and from about 0.05 percent to about 0.5 percent (and preferably from about 0.15 percent to about 0.25 percent) by-weight mechanical suspension material 34 (e.g., poly(acrylic acid) with a target value of 0.2 percent.

The orifice diameter is typically from about 30 to about 100 times the effective diameter (hydraulic diameter) of the particles of abrasive media. Hydraulic diameter is four times the area divided by the wetted perimeter. The abrasive may typically be from about 800 grit (14 micron maximum size or sieve size) to about 220 grit (66 micron sieve size).

Figure 3:
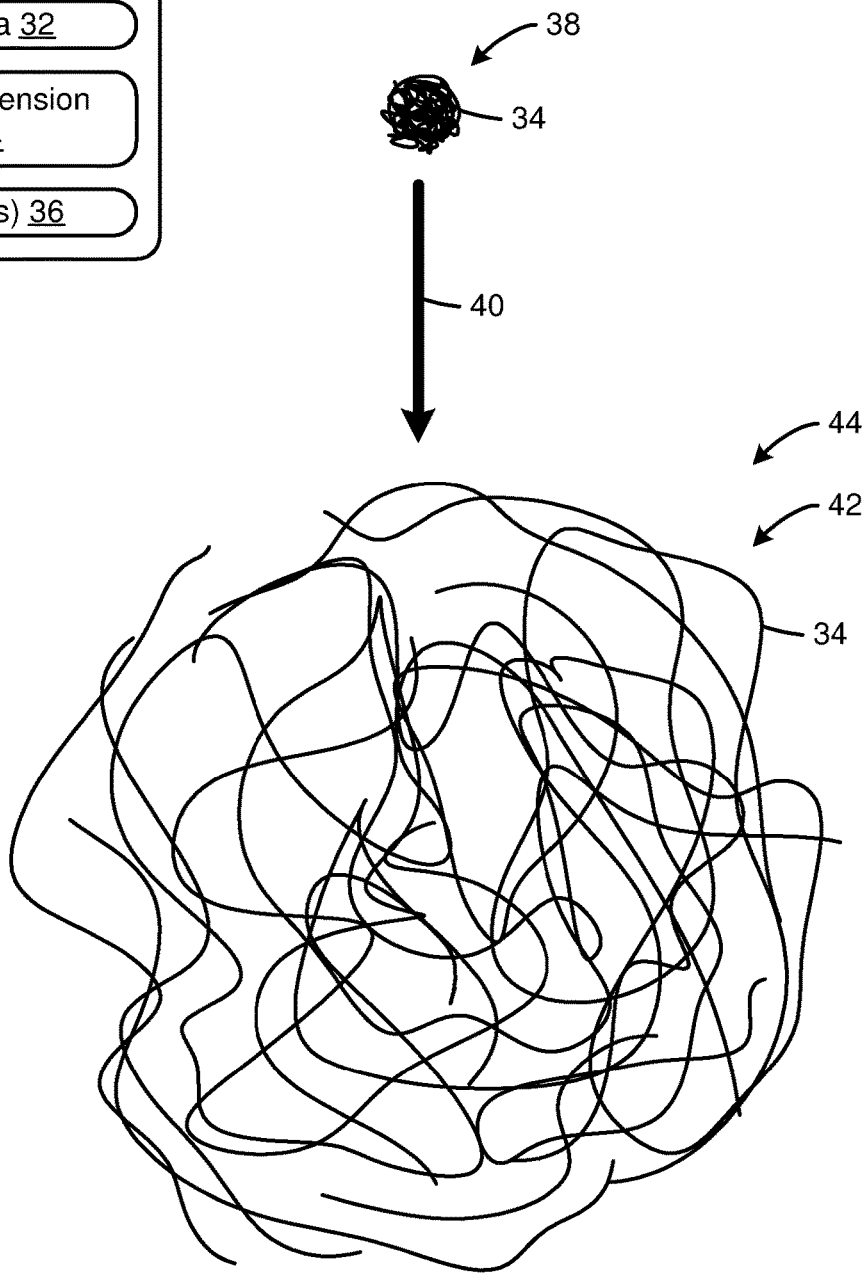
FIG. 3 is a schematic illustration showing a change that may occur as a polymeric material is hydrated in accordance with the present invention.

Referring to FIG. 3, in selected embodiments or situations, a polymer-based mechanical, suspension material 34 may be obtained as a "dry" powder or granular material comprising discrete particles 38 or granules 38. Accordingly, in a manufacturing process 40 or method 40, discrete particles 38 or granules 38 may be hydrated to form a quantity 42 of hydrated polymeric material 44.

As each discrete particle 38 or granule 38 of a mechanical suspension material 34 is hydrated, it may swell in size. Accordingly, the quantity 42 of hydrated polymeric material 42 produced by a particle 38 or granule 38 may be many times (e.g., 50 times) larger than the particle 38 or granule 38.

In selected embodiments, the quantity 42 of hydrated polymeric material 44 produced by a discrete particle 38 or granule 38 of mechanical suspension material 34 may itself be discrete. That is, a quantity 42 of hydrated polymeric material 44 produced by one particle 38 or granule 38 may abut another quantity 42 of hydrated polymeric material 44 produced by a neighboring particle 38 or granule 38. However, the quantities 42 of hydrated polymeric material 44 need not mix or combine in a significant way.

Alternatively, in a manufacturing process 40 or method 40, the various quantities 42 of hydrated polymeric material 44 produced by various particles 38 or granules 38 may be sufficiently flexible and malleable to mingle, mix, and combine. Accordingly, mixing abrasive media 34 into hydrated polymeric material 44 may mix and combine polymeric chains from a plurality of particles 38 or granules 38 until no corresponding discrete quantities 42 of hydrated polymeric material 44 can be identified.

In still other embodiments, a manufacturing process 40 or method 40 may produce neither discrete quantities 42 of hydrated polymeric material 44 nor an indistinguishable combination of polymeric chains from a plurality of particles 38 or granules 38. Rather, a manufacturing process 40 or method 40 may produce something between those two states. For example, a manufacturing process 40 or method 40 may produce various quantities 42 of hydrated polymeric material 44 that mix or combine at least partially (e.g., at their edges or extreme) with neighboring quantities 42, but maintain at least some individuality or individual cohesion to self and mutual separation from others.

Figure 4:
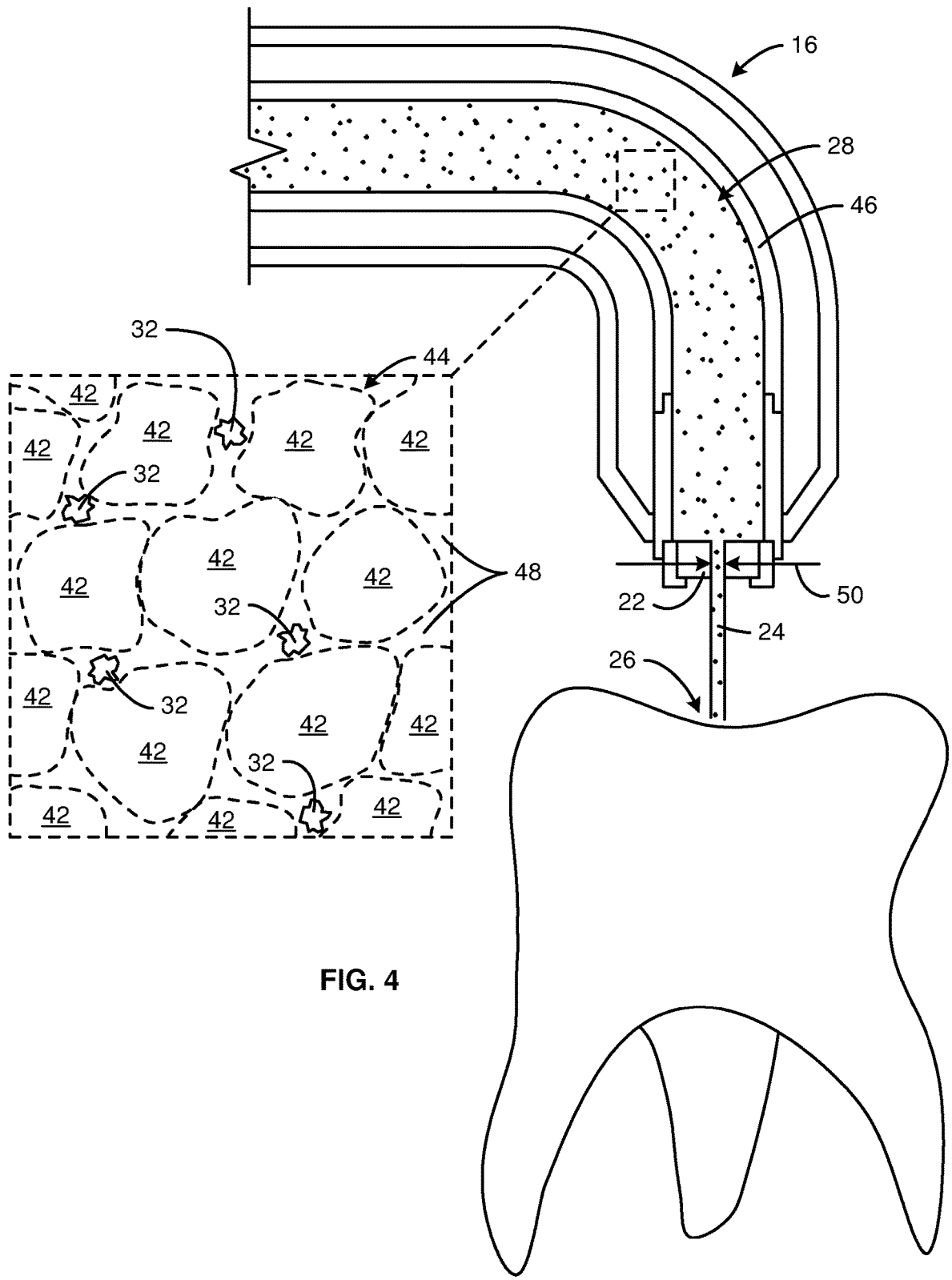
FIG. 4 is a schematic illustration showing how a hydrated polymeric material may suspend an abrasive material in accordance with the present invention.

Referring to FIG. 4, whether in a container on a shelf, sitting within a reservoir 12, stationary within a conduit 46 of an applicator 16, or moving through a conduit 46 in an applicator 16, mechanical suspension material 34 may block abrasive media 32 from settling out and degrading or destroying the utility of a slurry 28. This may be accomplished in any suitable manner.

For example, in selected embodiments, after an abrasive medium 32 has been distributed within a hydrated polymeric material 44, discrete quantities 42 of the material 44, intermingled polymeric chains from multiple quantities 42 of the material 44, or combinations thereof may form a structure through which particles of the abrasive media 32 cannot readily pass or move. Accordingly, forces produced by typical accelerations acting on the particles of abrasive media 32 may have only limited effect in disturbing an otherwise substantially even distribution of the abrasive media 32.

Thus, neither the acceleration of gravity nor accelerations associated with movement of a slurry (e.g., starting movement, stopping movement, or redirecting movement within a delivery system 10 or any component 12, 14, 16, 20, 28 thereof) may substantially disturb a distribution of the abrasive media 32 within a hydrated polymeric material 44.

In selected embodiments, a slurry 28 or hydrated polymeric material 44 in accordance with the present invention may exhibit both a macroviscosity and a microviscosity. For example, a macroviscosity for a hydrated polymer material 44 may be determined using a Brookfield viscometer or similar bulk method. However, a macroviscosity, while useful in certain situations, may fail to provide an accurate picture of the microstructure of the hydrated polymeric material 44.

That is, in certain embodiments, interstitial spaces 48 may exist between quantities 42 of hydrated polymeric material 44. For example, as set forth hereinabove, certain particles 38 or granules 38 may hydrate to form discrete quantities 42 of hydrated polymeric material 44 that do not mix or combine in a significant way. Accordingly, interstitial spaces 48 may exist between such quantities 42. The liquid 30 in these interstitial spaces 48 may have its own viscosity, which may be referred to as a microviscosity. In selected embodiments, the microviscosity of a hydrated polymeric material 44 may be nearly the same as that of water.

Depending on the relative size of one or more quantities 42 of hydrated polymeric material 44 and of the particles of abrasive media 32 distributed therewithin, interstitial spaces 48 may provide pathways through which the particles may migrate. Accordingly, in such a case, given sufficient time, temperature, vibration, or the like, or a combination thereof, some portion of the abrasive medium 32 may precipitate out of a slurry 28. However, under normal conditions, the precipitation process may proceed slowly, granting to a slurry 26 a shelf life of about six months or longer.

The size 50 (e.g., width, diameter, hydraulic diameter or the like) of an orifice in a nozzle 22 may be an important consideration in a delivery system 10 in accordance with the present invention. If the size 50 is too big, the velocity of the stream 24 exiting therethrough may be too low for optimum performance. Alternatively, or in addition thereto, too big an orifice may lower the precision of the abrading or drilling action produced. Conversely, if the size 50 is too small, the nozzle 22 may be susceptible to clogging.

In selected embodiments directed to the removal of decaying tooth material, an orifice size 50 (e.g., diameter) in the range of about 100 micron to about 200 microns may be acceptable, while a range of about 140 microns to about 160 microns may be preferred and about 152 microns may be a target or set point. Thus, in certain embodiments, a slurry 28 having abrasive media 32 of about 25 microns may be run through a delivery system 10 having a nozzle 22 with an orifice of about 152 microns.

Figure 5:
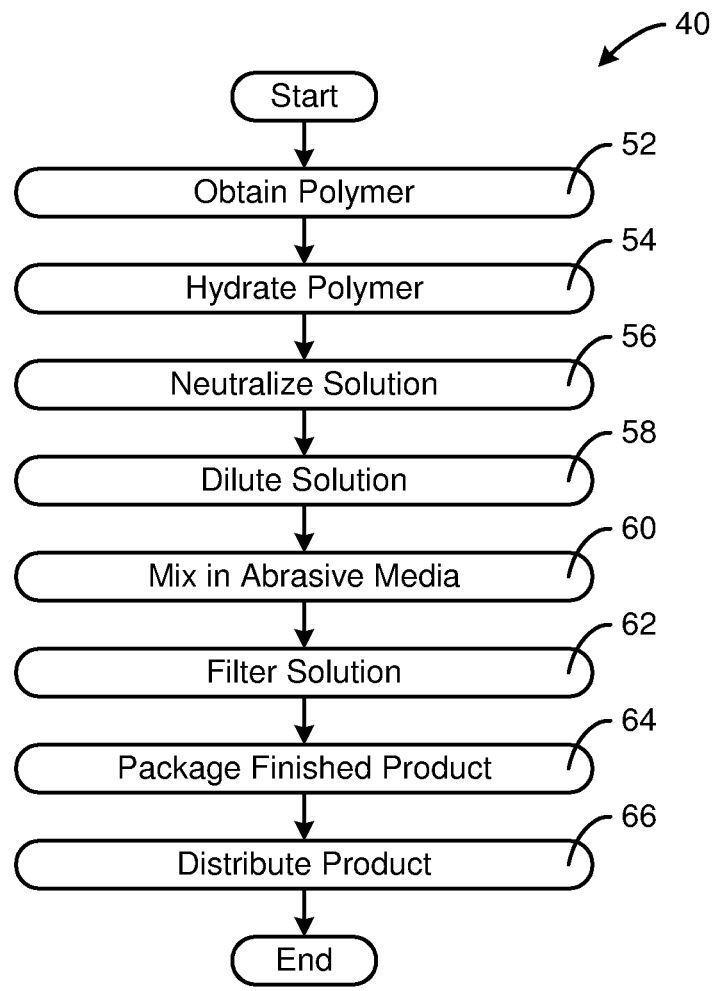
FIG. 5 is a schematic block diagram illustrating a method of manufacturing slurry in accordance with the present invention.

Referring to FIG. 5, a slurry 28 in accordance with the present invention may be manufactured or produced in any suitable manner or method. In selected embodiments, a mechanical suspension material 34 (e.g., a hygroscopic polymer) may be obtained in a hydrated or partially hydrated form. In other embodiments, mechanical suspension material 34 in the form of a hygroscopic polymer may be obtained 52 as a dry particles 38 or granules 38. Accordingly, the mechanical suspension material 34 may be hydrated 54 as part of a manufacturing process 40 or method 40.

In selected embodiments, a polymer being used as the mechanical suspension material 34 may benefit from neutralization 56 (raising the pH) with a base to obtain a solution for use in the mouth of a patient. The neutralization may ionize the polymer molecules and generate negative charges along the backbones thereof. Repulsions of like charges may then facilitate or promote further uncoiling of the polymer molecules.

Once a mechanical suspension material 34 has been hydrated, neutralized, or both the resulting solution may be diluted 58 to obtain a desired thickness or viscosity (e.g., a desired macroviscosity). Abrasive media 32 may then be added to the solution and mixed 60 in until it is substantially evenly distributed throughout the solution. The resulting product or solution may then be filtered 62, after which it may be ready for use.

In selected embodiments, a slurry 28 may be manufactured on site, on demand (e.g., just prior to being used), or both. Alternatively, due to the stability or shelf life of a slurry 28 in accordance with the present invention, the slurry 28 may be packaged 64 (e.g., placed in a container, labeled, etc.) and distributed 66 to one or more customers. Accordingly, when needed, the slurry 28 may be taken down from a shelf, rather than manufactured. This may lower the burden placed on users of the slurry 28 and ensure that a high-quality and consistent slurry 28 is used every time.

Figure 6:
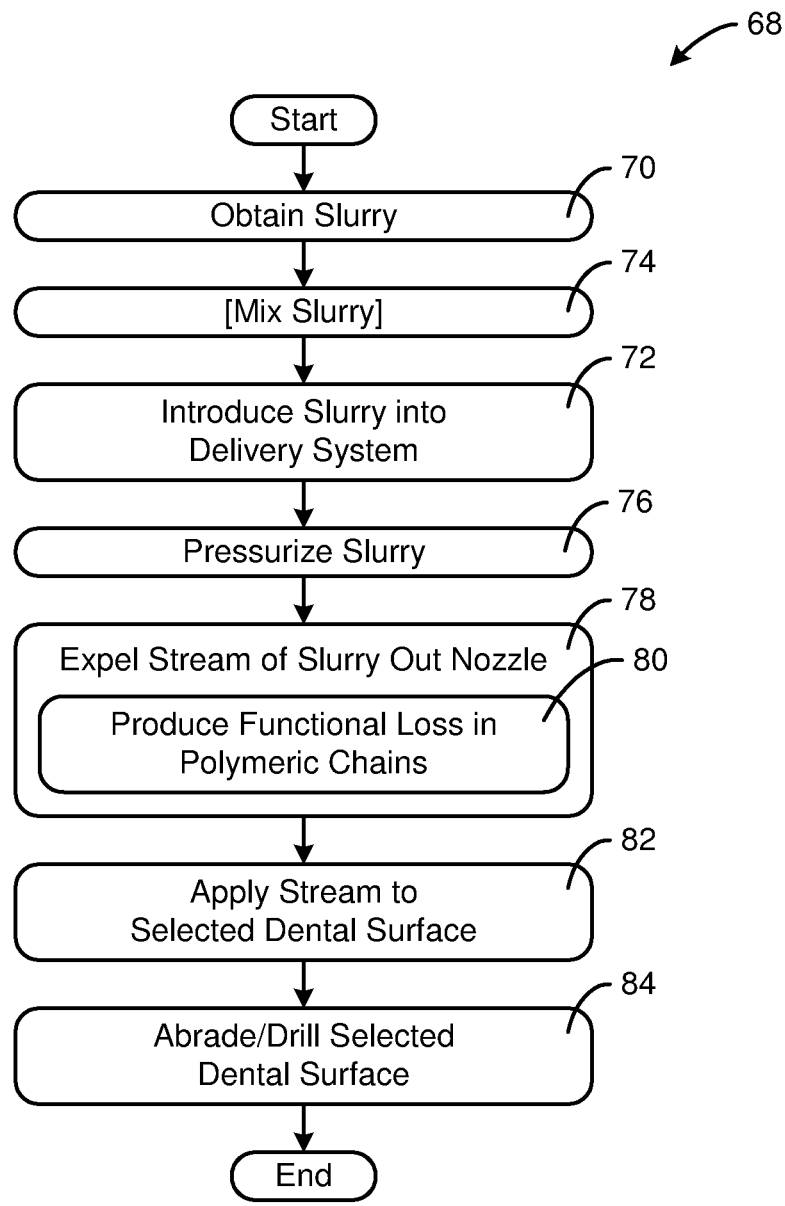
FIG. 6 is a schematic block diagram illustrating of method of using slurry in accordance with the present invention.

Referring to FIG. 6, a slurry 28 in accordance with the present invention may be used in any suitable manner. In selected embodiments, a method 68 of use may include running the slurry 28 through a delivery system 10. Such a method 68 may include obtaining 70 a quantity of slurry 27. This may be done by manufacturing the slurry 28 or purchasing a quantity of pre-manufactured (e.g., commercially available, packaged) slurry 26.

In selected embodiments, once the slurry 28 has been obtained 70, it may be introduced 72 into a delivery system 10. Alternatively, the slurry 28 may be mixed 74 before it is introduced 72 into a delivery system 10. For example, mixing 74 before such an introduction 72 may be necessary or beneficial if the slurry 28 has exceeded its shelf life.

After the slurry 28 has been introduced 72 into a delivery system 10, the slurry 28 may be pressurized 76. This may enable a stream 24 of slurry 28 to be expelled 78 out a nozzle 22 of the delivery system 10. Advantageously, in selected embodiments, as the slurry 28 is expelled 78 out the nozzle 22, the shear forces associated therewith may be sufficiently high to produce 80 permanent functional loss in polymeric chains of the mechanical suspension material 34.

That is, in certain embodiments, a mechanical suspension material 34 may impart to the corresponding slurry 28 a thick, somewhat gelatinous consistency. Before passing through a nozzle 22, such a consistency may be beneficial as it may aid in maintaining abrasive media 32 substantially evenly distributed within a slurry 28. However, depending on the application, a gelatinous consistency may be undesirable once the slurry 28 has exited a nozzle 22.

For example, in a dental environment, a stream 24 of slurry 28 may be used to excavate or drill out decayed tooth material. If such a stream 24 transports a gelatinous slurry to the subject surface 26, the gelatinous slurry may tend to build up. Such build up may obstruct a user's view of or access to the subject surface 26. Accordingly, the user may be forced to periodically clean (e.g., rinse) the subject surface 26.

However, by shearing polymeric chains with a force sufficient to produce 80 permanent functional loss, the ability of those chains to produce a thick, gelatinous consistency may be destroyed. Accordingly, after being sheared through a nozzle 22, a slurry 28 in accordance with the present invention may lose its gelatinous consistency and behave more like water (e.g., exhibit a macroviscosity and a microviscosity similar to that of water). This may enable abrasive media 32 within the slurry 28 to more fully perform its desired function upon impacting the subject surface 26. Moreover, it may enable the slurry 26, abrasive material 32, excavation or drilling debris, and the like to readily flow away from the subject surface 26 without building up.

The shear forces associated with passing through a nozzle 22 may produce 80 permanent functional loss of one or more polymeric chains in any suitable manner. In selected embodiments, the shear forces may break polymeric chains, break connections (e.g., crosslinking) between polymeric chains, or the like or combinations thereof. In certain embodiments, the shape, dimensions, or the like of a nozzle 22 may be selected to promote an increased shear force and the associated permanent functional loss.

Once a stream 24 of slurry 28 has been generated, it may be applied 82 to a desired subject surface 26. For example, it may be applied to a surface of a tooth. Accordingly, the stream 24 may abrade 84 or "drill" 84 into the subject surface 26. This may continue until the desired amount of abrasion or drilling has been accomplished.

The flowcharts in FIGS. 5 and 6 illustrate the functionality and operation of possible implementations of systems and methods according to certain embodiments of the present invention. It should be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for cutting a dental material, comprising:
   forming a hydrated polymerized acrylic acid by mixing water and a polymerized acrylic acid;
   neutralizing the hydrated polymerized acrylic acid with a base to ionize and uncoil the polymer chains of the polymerized acrylic acid to obtain a neutralized polymerized acrylic acid solution for use in the mouth of a patient;
   mixing an abrasive media with the neutralized polymerized acrylic acid to make a slurry comprising 5 to 30 wt % abrasive media and 0.05 to 0.5 wt % of the polymerized acrylic acid, wherein the abrasive media is mechanically suspended by polymer chains of the neutralized polymerized acrylic acid for at least one month;
   delivering the slurry to a nozzle, wherein the abrasive media remains suspended by the polymer chains of the neutralized polymerized acrylic acid; and
   expelling the slurry through the nozzle onto the dental material in the mouth of a patient with sufficient force so that the polymer chains of the neutralized polymerized acrylic acid are sheared, thereby reducing buildup of the neutralized polymerized acrylic acid on the dental material.

2. The method of claim 1, wherein the abrasive media comprises a plurality of particles having an effective diameter in the range of from 20 to 30 microns.

3. The method of claim 2, wherein the plurality of particles has an effective diameter of 25 microns.

4. The method of claim 1, wherein the nozzle comprises an aperture having a width in the range of from 50 to 250 microns.

5. The method of claim 4, wherein the aperture has a width ranging from 140 to 165 microns.

6. The method of claim 1, wherein the abrasive media remains suspended by the polymer chains of the neutralized polymerized acrylic acid for six months.

7. The method of claim 1, wherein the slurry is delivered to the nozzle at a pressure ranging from 250 psi to 17,000 psi.

8. The method of claim 7, wherein the pressure ranges from 500 psi to 2500 psi.

9. A method for cutting a tooth, comprising:
   forming a hydrated polymerized acrylic acid by mixing water and a polymerized acrylic acid;
   neutralizing the hydrated polymerized acrylic acid with a base to ionize and uncoil the polymer chains of the polymerized acrylic acid to obtain a neutralized polymerized acrylic acid solution for use in the mouth of a patient;
   mixing an abrasive media with the neutralized polymerized acrylic acid to make a slurry comprising 5 to 30 wt % abrasive media and 0.05 to 0.5 wt % of the polymerized acrylic acid, wherein the abrasive media is mechanically suspended by polymer chains of the neutralized polymerized acrylic acid;
   storing the slurry so that the abrasive media remains suspended by the polymer chains of the neutralized polymerized acrylic acid for at least one month;
   delivering the slurry to a nozzle, wherein the abrasive media remains suspended by the polymer chains of the neutralized polymerized acrylic acid; and
   expelling the slurry through the nozzle onto the tooth in the mouth of a patient with sufficient force so that the polymer chains of the neutralized polymerized acrylic acid are sheared, thereby reducing buildup of the neutralized polymerized acrylic acid on the tooth.

10. The method of claim 9, wherein the abrasive media comprises a plurality of particles having an effective diameter ranging from 20 to 30 microns.

11. The method of claim 9, wherein the nozzle comprises an aperture having a width ranging from 50 to 250 microns.

12. The method of claim 9, wherein the abrasive media remains suspended by the polymer chains of the neutralized polymerized acrylic acid for six months.

13. The method of claim 9, wherein the slurry is delivered to the nozzle at a pressure ranging from 250 psi to 17,000 psi.

14. A method for cutting a tooth, comprising:
forming a hydrated polymerized acrylic acid by mixing water and a polymerized acrylic acid;
neutralizing the hydrated polymerized acrylic acid with a base to ionize and uncoil polymer chains of the polymerized acrylic acid and form a neutralized polymerized acrylic acid;
mixing an abrasive media with the neutralized polymerized acrylic acid to make a slurry comprising 5 to 30 wt % abrasive media and 0.05 to 0.5 wt % of the polymerized acrylic acid, wherein the abrasive media is substantially evenly distributed throughout the slurry and mechanically suspended by polymer chains of the neutralized polymerized acrylic acid so the neutralized polymerized acrylic acid mechanically blocks particles of the abrasive media from migrating within liquid of the slurry;
storing the slurry in a reservoir so that the abrasive media remains fully suspended by the polymer chains of the neutralized polymerized acrylic acid for at least six months;
pressurizing the slurry to a pressure ranging from 500 psi to 2500 psi using a pressurizing device;
delivering the pressurized slurry through a conduit to an applicator containing a nozzle, wherein the abrasive media remains suspended by the polymer chains of the neutralized polymerized acrylic acid; and
expelling the pressurized slurry through the nozzle onto the tooth in the mouth of a patient with sufficient force so that the polymer chains of the neutralized polymerized acrylic acid are sheared, thereby reducing buildup of the neutralized polymerized acrylic acid on the tooth.

* * * * *